D. F. GLYNN.
AUTOMATIC FORGING MACHINE FOR THE MANUFACTURE OF HORSESHOES AND OTHER ARTICLES.
APPLICATION FILED AUG. 2, 1918.

1,399,764. Patented Dec. 13, 1921.
9 SHEETS—SHEET 1.

INVENTOR.
D. F. GLYNN,
BY John O. Seifert
ATTY.

D. F. GLYNN.
AUTOMATIC FORGING MACHINE FOR THE MANUFACTURE OF HORSESHOES AND OTHER ARTICLES.
APPLICATION FILED AUG. 2, 1918.

1,399,764.

Patented Dec. 13, 1921.
9 SHEETS—SHEET 2.

INVENTOR:
D. F. GLYNN
BY John O. Seifert
ATTY.

D. F. GLYNN.
AUTOMATIC FORGING MACHINE FOR THE MANUFACTURE OF HORSESHOES AND OTHER ARTICLES.
APPLICATION FILED AUG. 2, 1918.

1,399,764. Patented Dec. 13, 1921.
9 SHEETS—SHEET 4.

INVENTOR:
D. F. GLYNN
BY John O. Seifert
ATTY.

D. F. GLYNN.
AUTOMATIC FORGING MACHINE FOR THE MANUFACTURE OF HORSESHOES AND OTHER ARTICLES.
APPLICATION FILED AUG. 2, 1918.

1,399,764.

Patented Dec. 13, 1921.

INVENTOR:
D. F. GLYNN
By John O. Seifert,
ATTY.

D. F. GLYNN.
AUTOMATIC FORGING MACHINE FOR THE MANUFACTURE OF HORSESHOES AND OTHER ARTICLES.
APPLICATION FILED AUG. 2, 1918.

1,399,764.

Patented Dec. 13, 1921.

INVENTOR:
D. F. GLYNN
By John O. Seifert
ATTY.

D. F. GLYNN.
AUTOMATIC FORGING MACHINE FOR THE MANUFACTURE OF HORSESHOES AND OTHER ARTICLES.
APPLICATION FILED AUG. 2, 1918.

1,399,764.

Patented Dec. 13, 1921.

INVENTOR
D. F. GLYNN
BY John O. Seifert
ATTY.

UNITED STATES PATENT OFFICE.

DESMOND F. GLYNN, OF RANDWICK, NEW SOUTH WALES, AUSTRALIA.

AUTOMATIC FORGING-MACHINE FOR THE MANUFACTURE OF HORSESHOES AND OTHER ARTICLES.

1,399,764.      Specification of Letters Patent.      Patented Dec. 13, 1921.

Application filed August 2, 1918. Serial No. 248,065.

*To all whom it may concern:*

Be it known that I, DESMOND FRANCIS GLYNN, a subject of the King of Great Britain, residing at Randwick, in the State of New South Wales, Commonwealth of Australia, have invented new and useful Improvements in Automatic Forging-Machines for the Manufacture of Horseshoes and other Articles, of which the following is a specification.

This invention relates to an improved automatic forging machine for producing in repetition forged metal articles required in large quantities. The invention is particularly adapted for the manufacture of metal articles which require to be bent and subsequently forged, such as horseshoes, though it is not solely limited in its use to the production thereof.

It is an object of the invention to provide an automatic forging machine so constructed and arranged that metal articles can be bent and subsequently formed to a desired shape by a number of progressive forging operations with a minimum of manual attention by operatives.

It is a further object of the invention to provide a forging machine furnished with forging dies and having means for the automatic feeding of heated blanks to the dies, means for actuating the dies to exert pressure on said blanks so as to make them conform to a required shape and means for automatically removing the shaped or forged articles from the dies and from the machine.

The invention comprises a forging machine, on the frame of which are formed a plurality of guides within which operate slides. These slides are furnished with forging dies and/or rollers and are so operated in a predetermined sequence and relation as to cause said dies and rollers to operate on heated bars delivered thereto from a feed magazine to form said bars to a desired shape. Strippers remove the shaped or forged bars from the said dies and an extractor removes the forged work from the machine. The feed magazine, the forging dies and roller, the strippers and the extractor are all automatically operated by suitable mechanisms as cams, and the movements of these mechanisms are so timed in relation the one to the other that the operations of feeding the heated bars, the forging thereof, the stripping of the forging work from the dies and the extracting of the finished work from the machine are performed in a definite sequence and in a continuous manner.

With these and other objects in view the convention consists of the features of construction, combination and arrangement hereinafter fully described, reference being had to the accompanying explanatory drawings, wherein :—

Fig. 6ª is a view in half plan of Fig. 5.

Fig. 21ª is a diagrammatic inverted plan view of an upper die shown in Fig. 21.

In these drawings the numeral 1 designates an automatic forging machine constructed according to the invention and in which the base 2 supports vertical housings 3 which are connected by a top-piece or brace 4. The vertical housings are bolted or otherwise rigidly secured to said base or they may be cast integrally therewith. Bearings 5 are formed in the housings 3 to accommodate a crank-shaft 6. Fitted to said crank-shaft 6 is a gear wheel 7 which engages with a pinion 8 fixed on a main driving shaft 9. This driving shaft 9 is mounted in bearings 10 formed in said housings 3. A gear wheel 11 is fitted on a transverse cam-shaft 12 and engages with said pinion 8. The cam-shaft 12 is mounted in bearings 13 formed in the machine base 2 and carries a cam 15 which engages with and is designed to operate a rocking lever 16 which is pivotally mounted in the machine base 2.

Suitably mounted in bearings 17 in the machine base 2 is a longitudinal cam-shaft 18 which is driven from said transverse cam-shaft 12 through suitable transmission gearing such as bevel gears 19, spur gears 20, and an intermediate shaft 21.

Two cams 22 fitted on the cam-shaft 18 engage with rollers 23 attached to the lower ends of levers 24, which levers are pivotally mounted in the machine base 2. A vertical guide 25 is formed between the housings 3 and accommodates a slide 26 which is adapted to be reciprocated therein by means of the crank-shaft 6 and a connecting rod 27. This connecting rod is furnished with a screw connection 28 for adjustment purposes and clamp screws 29 for locking the adjustment when made. Formed on the upper portion of the machine base 2 are a longitudinal guide 30 and two transverse guides 31. A slide 32 is adapted to be operated in said guide 30 by means of said cam 15 and rocking lever 16.

A link 33 furnished at one end with buffer springs 34 and 35 connects the said rocking lever 16 to the slide 32. The purpose of the buffer spring 34 is to absorb the shock incidental to the completion of the inward stroke of said slide 32 and the spring 35 acts in a similar way while the inertia of said slide is being overcome at the beginning of the return or outward stroke.

Slides 36 are adapted to be operated simultaneously in said transverse guides 31 by the two cams 22 acting through the pivoted levers 24.

Figure 4:
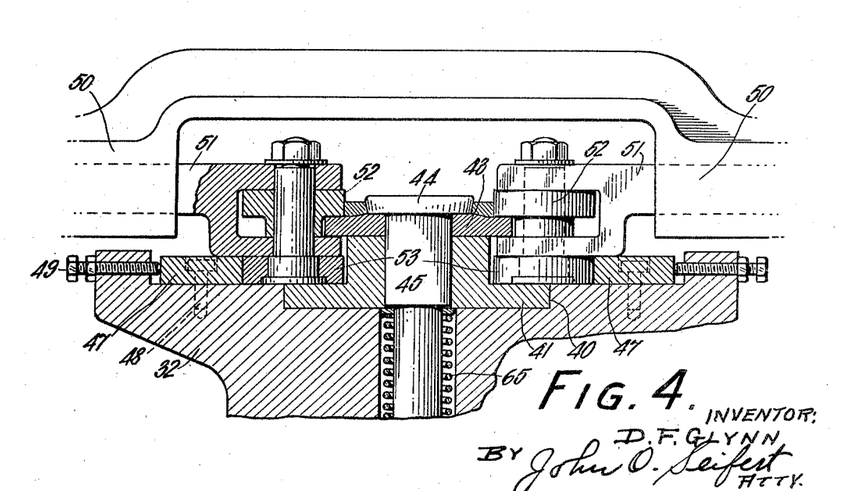
Figs. 4 and 5 are views in part transverse section of portions of the forging mechanism of the machine shown in Figs. 1, 2 and 3 but drawn to a larger scale.
Figure 14:
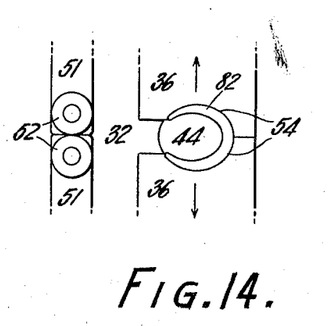
Figure 15:
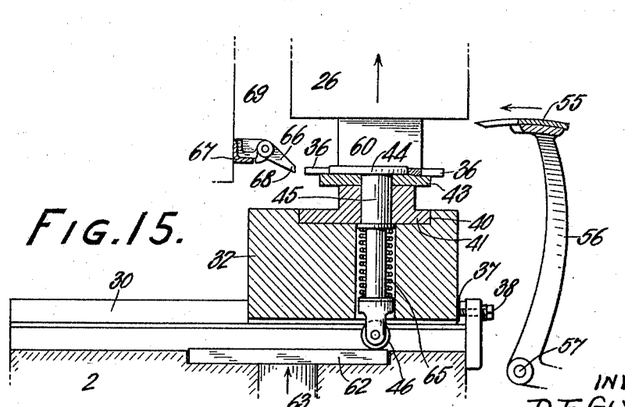
Figure 16:
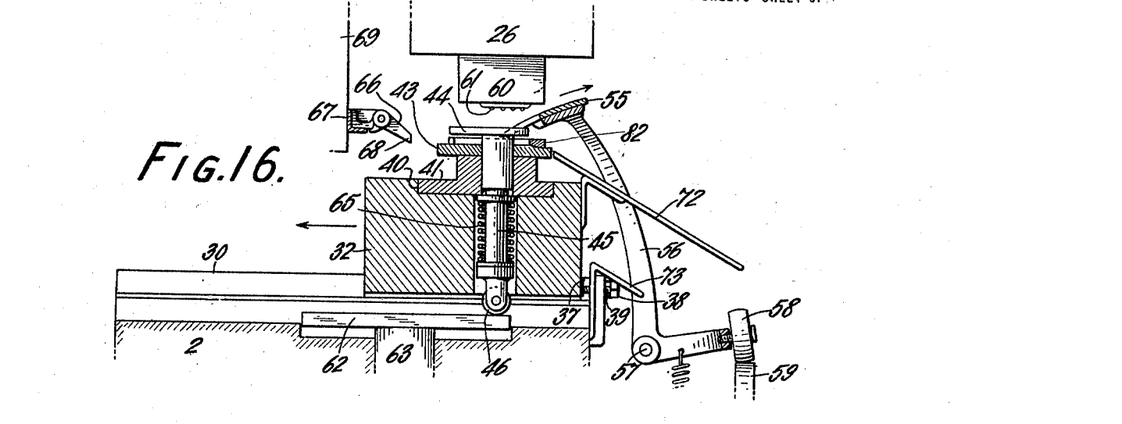

On the longitudinally operating slide 32 are formed lugs 37 which are designed to contact with adjustable stops 38 mounted on the machine base 2, lock-nuts 39 being provided to retain a set adjustment of said stops. (Figs. 14, 15 and 16.) On the upper surface of said slide 32 is formed a recess 40, in which a tool or die-support base 41 is secured and which will serve as a former guide. A seating ring or die 43 is suitably fixed as by screws to the said base 41. Within the seating ring 43 and surrounded thereby is an inner die-form 44, the periphery of which corresponds to the inner outline of the form of the article to be shaped, in the present instance a horseshoe. The outer edge 42 of said die-form 44 is tapered inwardly toward the base 41. This inner die-form 44 is mounted on a vertical stem 45 which has attached at its lower end a roller 46 and is adapted to have imparted thereto a limited vertical movement. 47 indicates former guides, which are furnished with suitable means for lateral adjustment such as screws 48 and means for the locking of the same in a set adjusted position such as set-screws 49. (Fig. 4.) These former guides 47 are secured on the upper surface of said longitudinal slide 32 and are disposed one on each side of said die-base 41. Transverse guides 50 which are fitted to the machine base 2 extend over the path of movement of the slide 32, and arms 51 are adapted to be moved transversely therein. On each of the inner opposed ends of the said arms 51 a forging or bending tool in the form of a roller 52 and a forming roller 53 are revolubly mounted. The forging rollers 52 are adapted to contact with the work to be forged when the same lies between said rollers 52 and the die-form 44 while the forming rollers 53 engage with the former guides 47 (Figs. 11 and 12).

Figure 11:
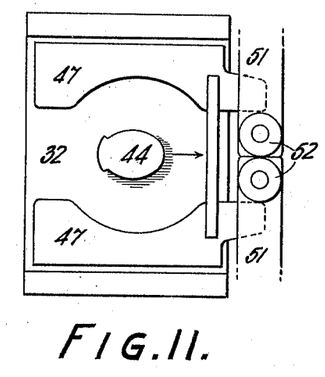
Figure 12:
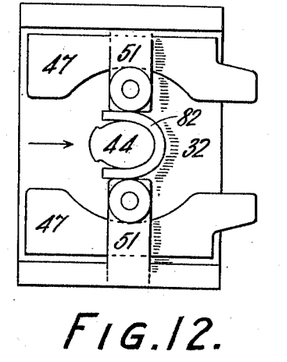
Figure 13:
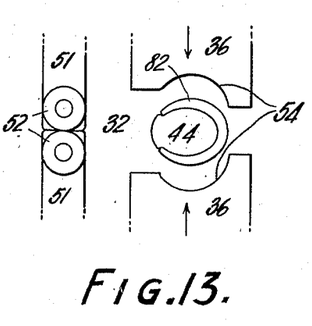

Side forming tools 54 are mounted on the inner opposed ends of the transverse slides 36 so as to lie on the same horizontal plane as the die-form 44 (Figs. 4, 11 and 12). These side forming tools are so shaped that when brought together by the advance of the slides 36 they form a split inclosing die of the correct outline desired.

A stripper plate 55 (Figs. 3, 15, 16 and 17) is mounted on a lever 56 pivoted at 57. Fitted at or near the lower end of said lever 56 is a roller 58 which is adapted to contact with a cam 59 on the longitudinal cam-shaft 18. A face-die 60 which is secured to the lower end of the vertical slide 26, has formed upon it or inserted therein tools 61 designed to impress in a horseshoe the fullering grooves. These tools 61 are so constructed and arranged that the angle of inclination of the side of the tool to the face of the die varies progressively from the heel to the toe in order that the fullering groove when formed in the shoe will insure the horseshoe nails, when inserted therein, lying in different planes according as their position is near or remote from the heel of the horseshoe. The angle of inclination of the animal's hoof varies and by constructing a horseshoe having the fullering grooves as aforesaid provision is made for correct fastening means with a mininum of discomfort to the animal.

A cam-plate 62 (Figs. 3, 5, 15, 16 and 17) is attached to a vertical slide 63 in the machine base 2 immediately beneath the path of the roller 46 located on the end of the stem 45. This cam plate 62 is raised at predetermined intervals by a cam 64 on the cam-shaft 18 so as to contact with the said roller 46. A coil spring 65 on the stem 45 insures the return of the latter to its lower position when released by said cam-plate 62. Two pawls or catches 66 are pivotally mounted on brackets 67 and they are constructed with lugs 68 which are designed to abut against the heel ends of a horseshoe on the said slide 32 during the retirement of said slide and to freely permit the passage of said horseshoe during the advance of said slide.

A feed magazine 69 (Figs. 7 to 10) communicates with the forging machine through a slidable cut-off gate 70 which is operated by the retiring movement of the slide 32 and is returned to its closed position by the action of a rocking bell-crank lever 70$^a$, one arm of which engages with said cut-off gate 70 and the other arm carries a weight 71.

An inclined chute 72 (Figs. 16 and 17) is attached to the forward end of the slide 32 and is designed to connect at a predetermined stage of the movement of said slide 32 with a delivery chute 73 secured to the rear of the machine base 2.

Horseshoes are required in many cases to be provided with a clip or projection which is commonly formed from the metal of the horseshoe itself. In order that clipped horseshoes may be made by the use of the present invention a clipping device—see Fig. 23—is employed by attachment to the automatic forging machine hereinbefore described. This clipping attachment comprises a lever 74 pivotally mounted on a bracket 75 attached to the housing 3. At the forward end of said lever 74 is fitted a clipping tool 76 and a roller 77 is revolubly mounted at the rear end of said lever. This roller 77 contacts with a former guide 78 secured to the longitudinal slide 32 and a spring 79 insures that said roller constantly remains in contact with said former guide. This former guide 78 is constructed or shaped with a raised portion as 78$^a$ in order that as the longitudinal slide 32 advances the roller 77 is forced to pass along and follow the contour of the former guide 78 and thereby cause a sharp descent and ascent of the end of the pivoted lever 74 carrying the clipping tool 76. It will be obvious that in lieu of the particular contour of the former guide 78 described and illustrated for the purpose of obtaining this sharp descent and ascent of the end of the pivoted lever 74 carrying the clipping tool 76 caused by the travel of the longitudinal slide 32, the said former guide 78 can be otherwise constructed as with a groove or race to operate a suitable combination of levers to obtain the same result. A clip finishing tool 80$^a$ is attached to the face-die 60 and a recess 80$^b$ may be formed in the periphery of the seating die 43.

Figure 19:
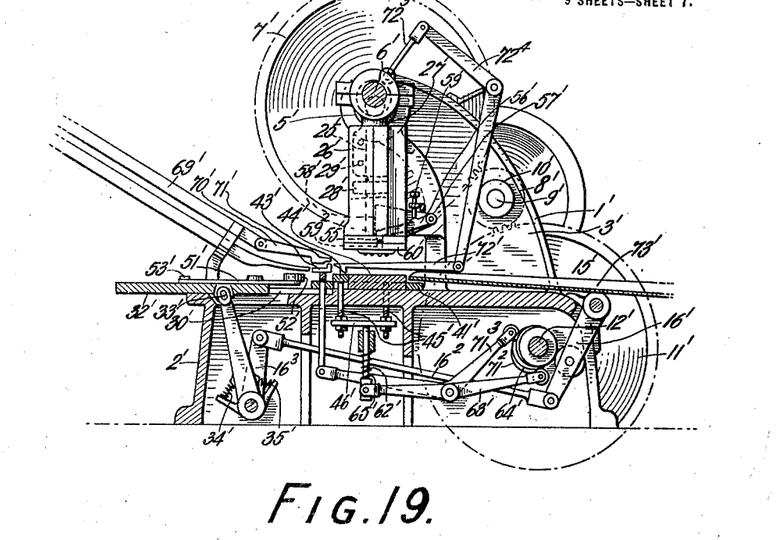
Fig. 19 is a view in sectional elevation of a machine constructed in accordance with the invention and wherein the work is forged on a stationary die-form.
Figure 20:
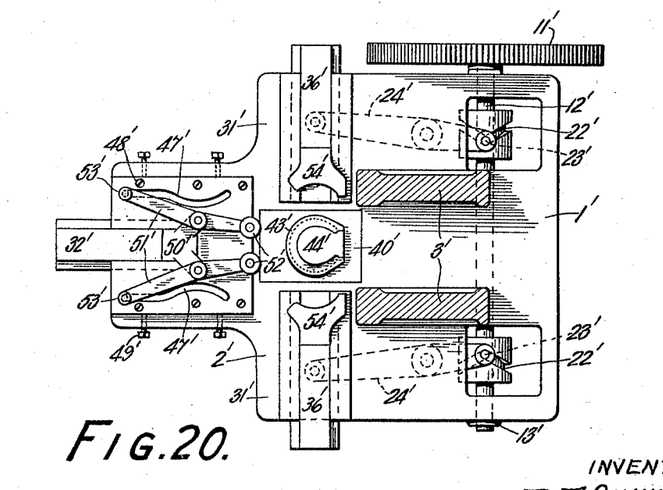
Fig. 20 is a view in sectional plan of the machine shown in Fig. 19.

In Figs 19 and 20 there is illustrated a modified automatic forging machine 1$^1$ constructed according to the invention, the modification being characterized essentially by a construction and an arrangement of the parts whereby the work is maintained at all times in a fixed position on the machine frame.

In this modified machine the machine base 2$^1$ supports vertical housings 3$^1$ and bearings 5$^1$ are formed in said housings to accommodate a crank-shaft 6$^1$. Fitted to said crank-shaft 6$^1$ is a gear wheel 7$^1$ which engages with a pinion 8$^1$ fixed on the main driving shaft 9$^1$. This driving shaft 9$^1$ is mounted in bearings 10$^1$ formed in said housings 3$^1$. A gear wheel 11$^1$ is fitted on a transverse cam-shaft 12$^1$ and engages with said pinion 8$^1$. This cam-shaft 12$^1$ is mounted in bearings 13$^1$ formed in the machine base 2$^1$ and carries a cam 15$^1$ which engages with and is designed to operate a rocking lever 16$^1$ which is pivotally mounted in the machine base 2$^1$. This lever 16$^1$ is connected by a rod 16$^2$ to another rocking lever 16$^3$ pivoted in the machine base 2$^1$.

Two cams 22$^1$ fitted on the cam-shaft 12$^1$ engage with rollers 23$^1$ attached to the rear ends of levers 24$^1$, which levers are pivotally mounted in the machine base 2$^1$. A vertical guide 25$^1$ is formed between the housings 3$^1$ and accommodates a slide 26$^1$ which is adapted to be reciprocated therein by means of the crank-shaft 6$^1$ and a connecting rod 27$^1$. This connecting rod 27$^1$ is furnished with a screw-connection 28$^1$ for adjustment purposes and clamp screws 29$^1$ for locking the adjustment when made.

Formed on the upper portion of the machine base 2$^1$ are a longitudinal guide 30$^1$ and two transverse guides 31$^1$. A slide 32$^1$ is adapted to be operated in the said guide 30$^1$ by means of the said cam 15$^1$, the rocking levers 16$^1$ and 16$^3$ and the connecting rod 16$^2$.

The rocking lever 16$^3$ operates the slide 32$^1$ through a connection 33$^1$ located at its upper end. Buffer springs 34$^1$ and 35$^1$ are provided on the machine base 2$^1$ to absorb the shock incidental to the reversal of the stroke of the said slide 32$^1$. Two slides 36$^1$ are provided and are adapted to be operated simultaneously in the said transverse guides 31$^1$ by the two cams 22$^1$ acting through the pivoted levers 24$^1$.

A tool or die-table 40$^1$ is formed on the top of the machine base 2$^1$ immediately beneath the vertical slide 26$^1$. A tool or die-support base 41$^1$ is secured on said die-table 40$^1$ in an approved manner as by bolts and a seating ring or die 43¹ is fitted into a recess 43² in said die-support base 41¹ in such manner as to be capable of limited vertical movement. Within the seating die 43¹ is an inner die-form 44¹, the periphery of which corresponds to the inner outline of the horseshoe shape desired. This seating die 43¹ is attached to vertically disposed rods 45¹ which are connected at their lower ends to a plate 46¹.

47¹ indicates former guides, which are furnished with suitable means for lateral adjustment such as screws 48¹ and means for the locking of the same in a set adjusted position as set-screws 49¹. These former guides 47¹ are secured on the upper surface of the machine base 2¹ and are disposed one on each side of the die-base 41¹.

A detachable plate 50¹ is secured on the forward end of the said slide 32¹ and pivotally mounted thereon are levers 51¹. On each of the inner opposed ends of the said levers 51¹ a forging roller 52¹ and a forming roller 53¹ are revolubly mounted. The forging rollers 52¹ are adapted to contact with the work to be forged when the same lies between the said rollers 52¹ and the die-form 44¹, while the forming rollers 53¹ engage with the former guides 47¹. Side forming tools 54¹ are mounted on the inner opposed ends of the transverse slides 36¹ so as to lie on the same horizontal plane, as the die-form 44¹.

A stripper or knock-out knob 55¹ is formed integrally on the free end of a pivoted lever 56¹ which is pivotally mounted in a bracket 57¹ carried on the rear wall of the slide 26¹. The free end of said lever 56¹ projects through a slot 58¹ formed in the said rear wall of said slide 26¹ and contacts at any predetermined point on the upstroke of said slide with an adjustable stop 59¹ secured on the housing 3¹ and with the upper end of a vertically disposed rod 59².

Figure 21:
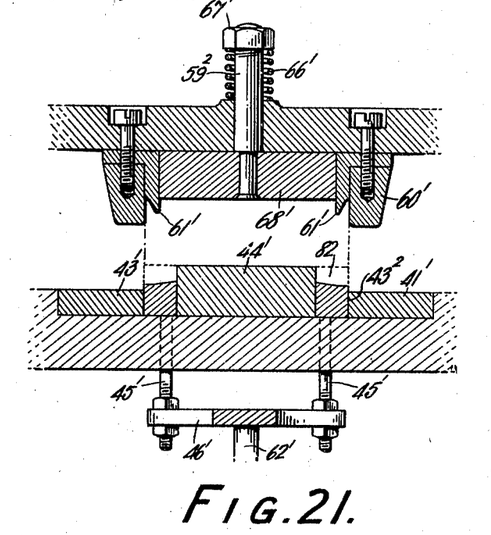
Fig. 21 is a view in section of the dies used in the machine shown in Figs. 19 and 20.
Figure 21A:
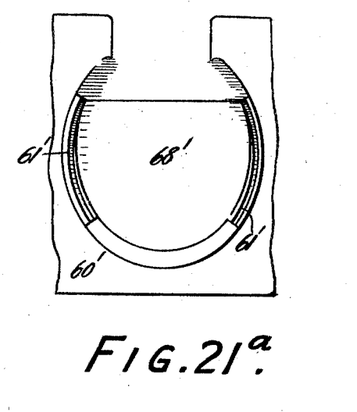

A die 60¹—illustrated in detail in Figs. 21 and 21ᴬ—is secured to the lower end of the vertical slide 26¹ and has formed within it or inserted therein tools 61¹ designed to impress in a horseshoe the necessary fullering grooves. These tools 61¹ are so constructed and arranged that the angle of inclination of the side of the tool to the face of the die 60¹ varies progressively from the heel to the toe for the purpose hereinbefore described with reference to the machine illustrated in Figs. 1, 2 and 3.

A rod 62¹, connected at its upper end to said plate 46¹, is designed to be raised and lowered a predetermined distance and at set intervals by a rocking lever 63¹ pivoted in the machine base 2¹ and actuated by a cam 64¹ on the said cam-shaft 12¹. Should a face cam be employed in lieu of the grooved cam 64¹ a coil spring 65¹ (shown in broken lines) would be used to return the rod 62¹ to its lower position when released by said cam 64¹. A coil spring 66¹ surrounds the vertically disposed rod 59² and is restrained in position by a cap 67¹.

A stripper 68¹ is secured to the lower end of said vertical rod 59² and forms the roof of the die 60¹.

A feed magazine 69¹ communicates with the forging machine 1¹ through a hinged cut-off gate 70¹. This cut-off gate is lifted by the vertical movement of a feeding platform 71¹ which is actuated by a cam 71² through a rocking lever 71³.

An extractor lever 72¹ is operated by a cam 72² on the crankshaft 6¹ through a connecting rod 72³ and a rocking lever 72⁴.

An inclined slide 73¹ is attached to the machine base 2¹ and leads from the die-form 44¹ out through the rear of said machine.

Figure 23:
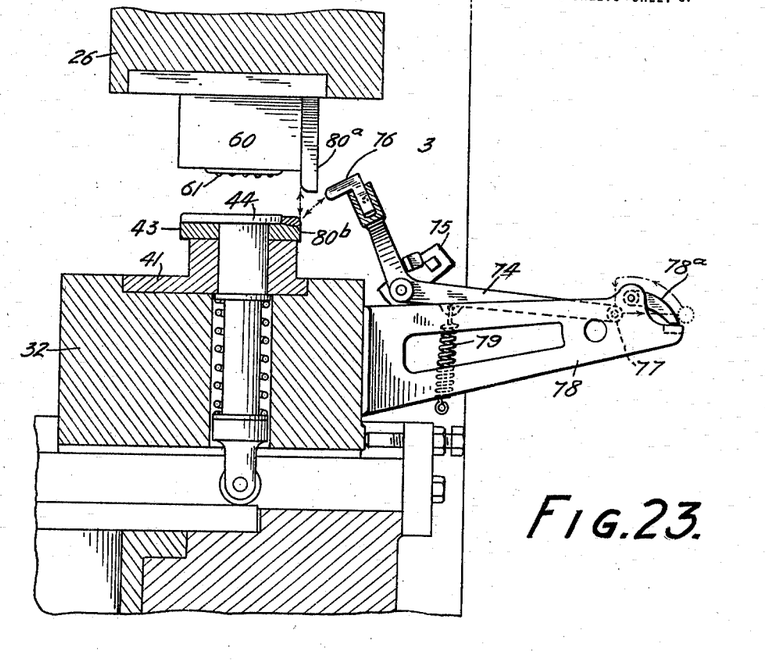
Fig. 23 is a view in side elevation of a clipping attachment to the forging machine illustrated in Figs. 1, 2 and 3
Figure 24:
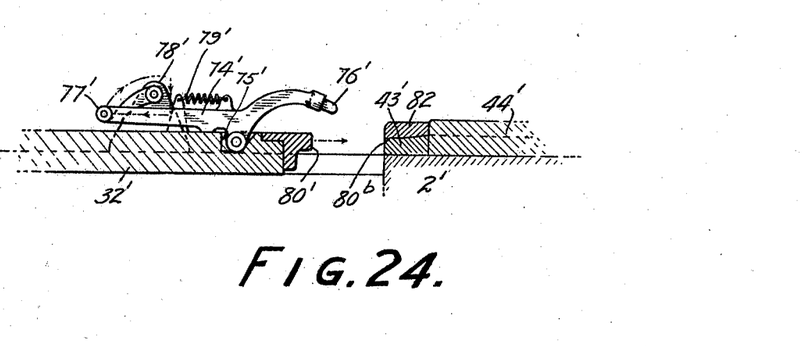
—and Fig. 24 is a view in side elevation of a modified clipping attachment to the modified forging machine illustrated in Figs. 19 and 20.

Referring now to Fig. 24, the numeral 74¹ indicates a lever pivotally mounted on a bracket 75¹ on the longitudinal slide 32¹. At the forward end of said lever 75¹ is fitted a clipping tool 76¹ and a roller 77¹ is revolubly mounted at the rear end of said lever. This roller 77¹ contacts with a former guide 78¹ secured on the machine base 2¹ and a spring 79¹ insures that said roller constantly remains in contact with said former guide. This former guide 78¹ is constructed similarly to and exercises the same functions as the former guide 78 described with reference to Fig. 23.

A clip finishing tool 80¹ is secured to the forward end of the slide 32¹.

The modus operandi of the automatic forging machine shown in Figs. 1, 2 and 3, and the sequence of operations of which machine is illustrated by the diagrammatic views Figs. 8 to 17 inclusive, is as follows:—

Figure 6:
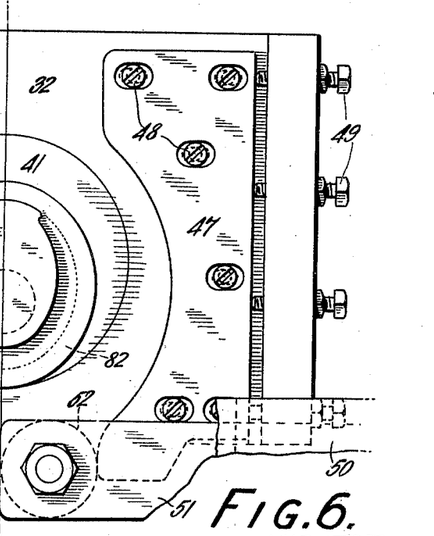
Fig. 6 is a view in half plan of Fig. 4.
Figure 6A:
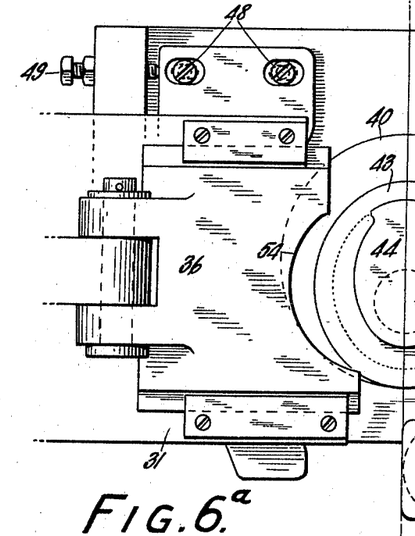
Figure 7:
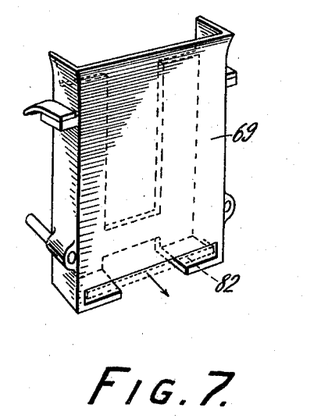
Fig. 7 is a view in perspective of a feed magazine for the blanks.
Figure 8:
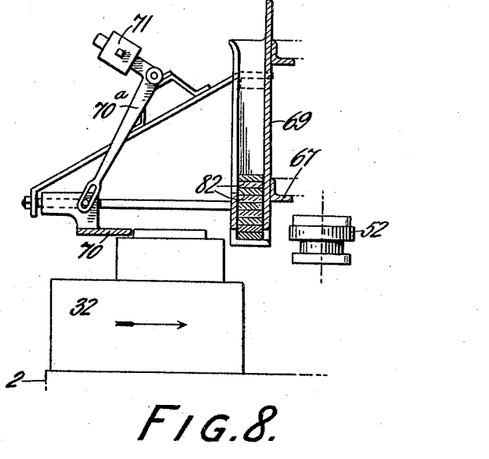
Figs. 8 to 17 are diagrammatic views illustrating various stages in the cycle of operations of the machine shown in Figs. 1, 2 and 3.
Figure 9:
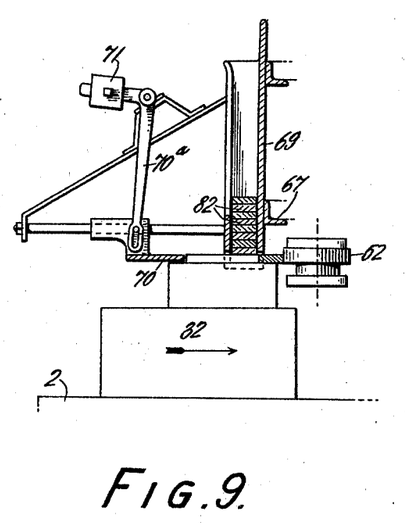
Figure 10:
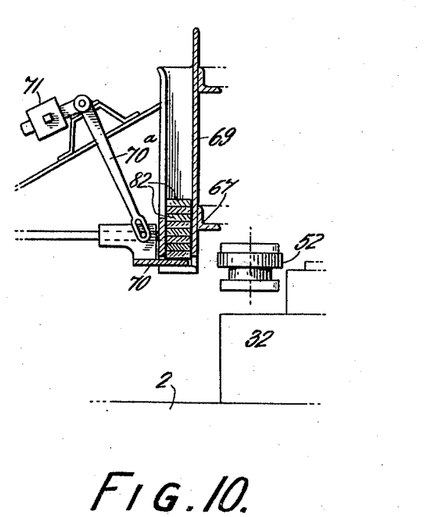

Bars of metal 82 of required section and previously cut to a correct length (said bars being referred to as blanks) having been heated to a suitable forging temperature are placed in the feed magazine 69 as is shown in Fig. 8. At the commencement of the cycle of operations the longitudinal slide 32 and the transverse slides 36 are at the limit of their outward strokes and the cam 15 and the two cams 22 are so designed and timed as to cause the said slides 32 and 36 to remain at rest in that initial position for predetermined periods. The vertical slide 26 is at a set position on its upstroke and the arms 51 are at the limit of their inward movement as shown in Figs. 6 and 11.

The first blank 82 is placed in position on the slide 32 in front of and edgewise to the inner die-form 44 (Fig. 11), and the machine is put into action by revolving the main shaft 9 which transmits continuous rotary movement to the transverse cam-shaft 12, the longitudinal cam-shaft 18 and the crank-shaft 6 through the gearing shown.

The cam 15 acting through the lever 16 causes the longitudinal slide 32 to advance from its feed or outward limit position A (Fig. 8) to its final inward position B (Fig. 15) and maintains it in that position for a predetermined period. During the advance of the said slide 32 the former guides 47 contact with the former rollers 53 mounted on the arms 51 and cause the latter to move in and out according to the contour of the said former guides 47. The forging rollers 52 are thereby made to roll the blank 82 around the advancing die-form 44 and to impart to the outer outline of said blank a form corresponding to the contour of the former guides 47. This movement is illustrated diagrammatically in plan by Figs. 11, 12 and 13, and in sectional elevation by Figs. 9 and 10.

When the said slide 32 has reached the inward limit of its allotted travel the lug 37 on said slide contacts with the adjustable stop 38 on the machine base 2 and thus accurately alines the bent and formed horseshoe carried on said slide directly under the face-die 60. Any jar caused by this positive alinement is absorbed by the buffer springs 34 and 35.

Figure 5:
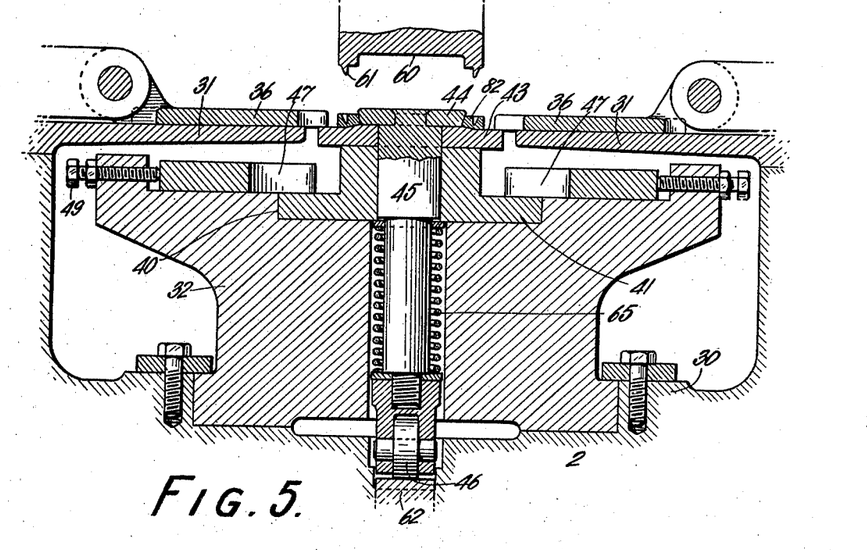

Immediately the said slide 32 has come to rest in the inward position B (Fig. 15) and prior to the completion of the descent of the vertical slide 26 the cams 22 acting through the pivoted levers 24 cause the transverse slides 36 to advance inwardly and to exert and maintain a pressure on the outer outline of the bent and formed blank 82 (Fig. 11). The side forming dies 54 on the inner ends of the said slides 36 form in this position a split containing die for the said bent and formed blank as is illustrated in Fig. 14. The vertical slide 26 continuing its descent causes the face-die 60 carrying fullering tools 61 to contact with the face of the bent and formed blank 82 and under considerable pressure exerted from the geared crank-shaft 6 the fullering grooves 82 are impressed into the surface of said blank 82 which is uppermost in the machine and the seating recess 84 is simultaneously formed on the opposite surface of the horseshoe by means of the seating die 43 as is shown in Fig. 5.

At the moment of completion of the downstroke of the vertical slide 26 the horseshoe 82 is thus completely encompassed on all sides by the various co-acting tools or dies described and is subjected to considerable pressure which causes the heated metal of the said horseshoe in a manner designed to completely fill the formed space between the said dies. This results in the production of a horseshoe which is well formed and finished to the desired shape and which may be uniformly duplicated any number of times without variation.

When the crank-shaft 6 passes over the bottom center and the vertical slide 26 commences its up-stroke the horseshoe is restrained from rising with it by reason of the undercut 42 on the inner die-form 44 and the side tools 54.

When the face-die 60 is completely clear of the said horseshoe 82 the cams 22 on the longitudinal cam-shaft 18 cause the transverse slides 36 to quickly retire to the limit of their outward movement and to remain in such position during the remainder of the cycle of operations. Simultaneously with the retirement of the transverse slides 36 the stripper plate 55 is caused to advance and take up a position above the fullered surface of the horseshoe 82 by the action of the cam 59 on the roller 58. The action of the stripper plate 55 is diagrammatically illustrated in Figs. 15, 16 and 17.

The inner die-form 44 being attached to the upper end of the stem 45 is caused by the action of the cam-plate 62 on the roller 46 fixed to the lower end of the said stem 45 to rise at this stage vertically upward sufficient to clear the uppermost face of the now completely forged horseshoe 82. The said cam-plate 62 is raised into this active position and maintained therein for a predetermined period by the cam 64 on the longitudinal cam-shaft 18 as shown in Figs. 16 and 17.

Figure 17:
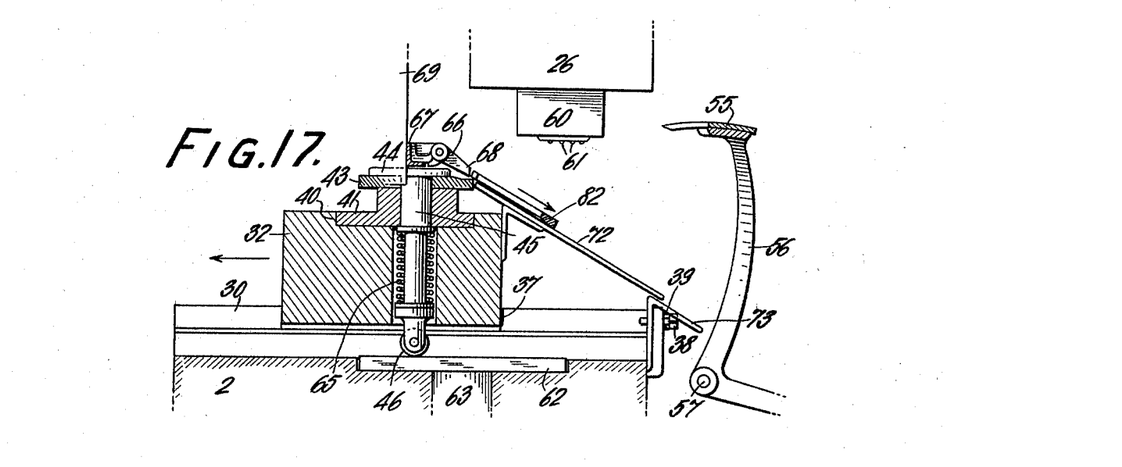
Figure 18:
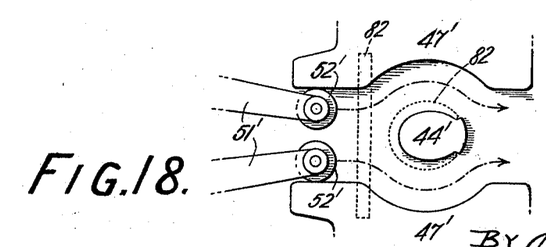
Fig. 18 is a diagrammatic view illustrating an alternative forging action for a machine made in accordance with the invention.

The cam 15 on the transverse cam-shaft 12 acting through the lever 16 and the link 33 now causes the longitudinal slide 32 to retire to the limit A of its outward travel carrying the completely forged horseshoe 82 with it until at a predetermined point of the stroke the heel ends of the said horseshoe abut against the lugs 68 of the catches 66 and the continuation of the stroke causes the said horseshoe to be swept by the said catches 66 from the slide 32, whence it falls onto the inclined chute 72 as shown in Fig. 17. After the horseshoe 82 has been removed from the slide 32 the cam 64 on the longitudinal shaft 18 allows the cam-plate 62 to retire from its active position of contact with the roller 46 whereupon the inner die-form 44 is constrained by the spring 65 on the stem 45 to return to its position within the seating-die 43. As the slide 32 approaches the outward limit A of its stroke the die-form 44 engages with and draws back the cut-off gate 70 thereby releasing another blank from the magazines 69 which blank is deposited in front of the forging roller 52 and edgewise to the said die-form 44. For unclipped horseshoes this completes the cycle of operations and it will be understood that the machine is both continuous and automatic in its action.

The modus operandi of the modified automatic forging machine illustrated in Figs. 19 and 20 is as follows:—

Blanks 82 are fed into the magazine $69^1$, and at the commencement of the cycle of operations the longitudinal slide $32^1$ and the transverse slides $36^1$ are at rest in their outward limit positions and the vertical slide $26^1$ is at a predetermined point of its up-stroke. The machine is started by revolving the main shaft $9^1$ which transmits continuous rotary movement to the crank-shaft $6^1$ and the cam-shaft $12^1$ through the gearing described.

The cams $15^1$ and $22^1$ on said shaft are so designed and timed that the longitudinal slide $32^1$ and the transverse slides $36^1$ are maintained at rest in their respective outward positions for predetermined periods. The cam $71^2$ on the cam-shaft $12^1$ acting through the rocking lever $71^3$ causes the feed platform $71^1$ to rise and contact with the hinged cut-off gate $70^1$ which is thereby raised and permits a blank 82 to be discharged onto the said feed platform which is then lowered by the action of said cam $71^2$ to its primary position. The blank is thus presented edgewise to the inner die-form $44^1$ and is immediately in front of the forging rollers $52^1$.

The longitudinal slide $32^1$ is now caused by the said cam $15^1$ to advance and the pivoted levers $51^1$ mounted on said slide $32^1$ carry the blank 82 ahead of the revolubly attached forging rollers $52^1$.

The passage of the former rollers $53^1$ along the former guides $47^1$ causes the forging rollers $52^1$ to roll the blank 82 around the inner die-form $44^1$ during the advance of the slide $32^1$ and an outer outline is imparted to said bent blank, which outline is controlled by the contour of the said former guides $47^1$.

The said slide $32^1$ after the completion of it advanced or inward stroke immediately retires, leaving the bent and shaped blank 82 around the die-form $44^1$.

The cams $22^1$ then cause the transverse slides $36^1$ to advance and exert a pressure through the side forming dies $54^1$ on the outer outline of the now bent and shaped blank 82, the said outline being thereby corrected. The said slides $36^1$ then retire prior to the completion of the descent of the vertical slide $26^1$. This vertical slide $26^1$ on the completion of its descent causes the die $60^1$ to completely inclose the blank 82 (Fig. 21) whereupon the fullering tool $61^1$ and the seating die $43^1$ under pressure exerted from the geared crank-shaft $6^1$ impress the fullering grooves 83 and the seating recess 84, respectively, on the upper and lower surface of the horseshoe 82. The metal of the horseshoe being thus completely encompassed by dies and subjected to considerable pressure while at forging temperature is caused to flow and fill the said dies.

As the crank-shaft $6^1$ passes over the bottom center and the vertical slide $26^1$ commences its up-stroke the seating die $43^1$ is caused by the cam $64^1$ acting through the rocking lever $63^1$ and the vertical rods $46^1$ and $45^1$ to rise and follow the die $60^1$ until the top of the said seating die is flush with or slightly above the top surface of the inner die-form $44^1$. The now completely forged horseshoe 82 is thus stripped from around the die-form $44^1$ and rests on the temporarily raised seating die $43^1$. The vertical slide $26^1$ continues its ascent and should the horseshoe 82 remain within the die $60^1$ and be lifted thereby from the seating-die $43^1$ it is stripped from the die $60^1$ at a predetermined point of the up-stroke by the action of the stripper $68^1$ which forms the roof of said die $60^1$. The said stripper $68^1$ is caused to move downward through the die $60^1$ until the horseshoe 82 is quite clear of the said die by the impact of the knock-out knob $55^1$ formed at the free end of the pivoted lever $56^1$ against the cap $67^1$ fitted to the upper end of the vertically disposed rod $59^1$. It is thus insured that the completely forged horseshoe will at a predetermined stage in the cycle of operations rest on the temporarily raised seating-die $43^1$, whence it is drawn toward the rear of the machine onto the inclined slide or chute $73^1$ by the extractor lever $72^1$. This extractor lever is advanced from its position at the rear of the machine so as to engage with the completed horseshoe and is withdrawn from such active position by the cam $72^2$ on the crank-shaft $6^1$ through the connecting rod $72^3$ and the rocking lever $72^4$.

Figure 1:
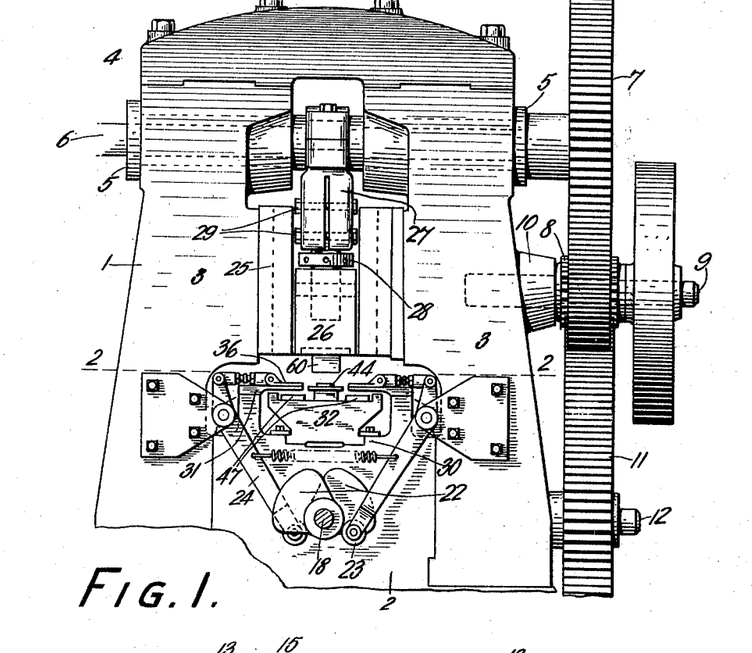
Figure 1 illustrates in end elevation a machine constructed in accordance with the invention and applied to the manufacture of horseshoes.
Figure 2:
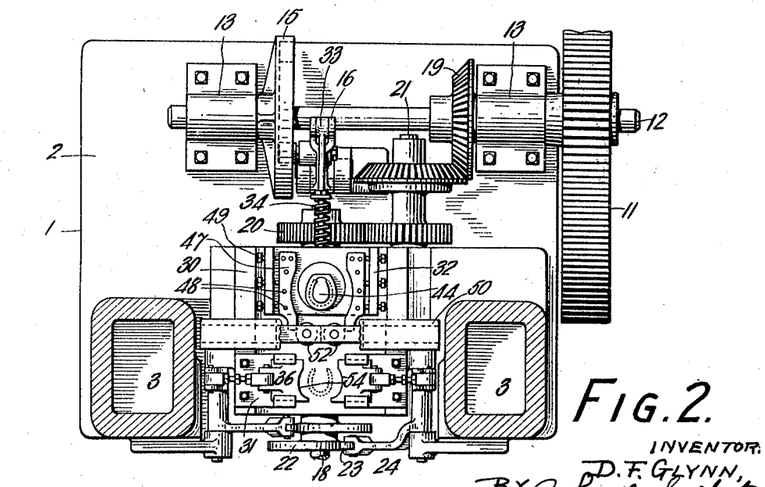
Fig. 2 is a plan view in section taken on the line 2—2 of Fig. 1.
Figure 3:
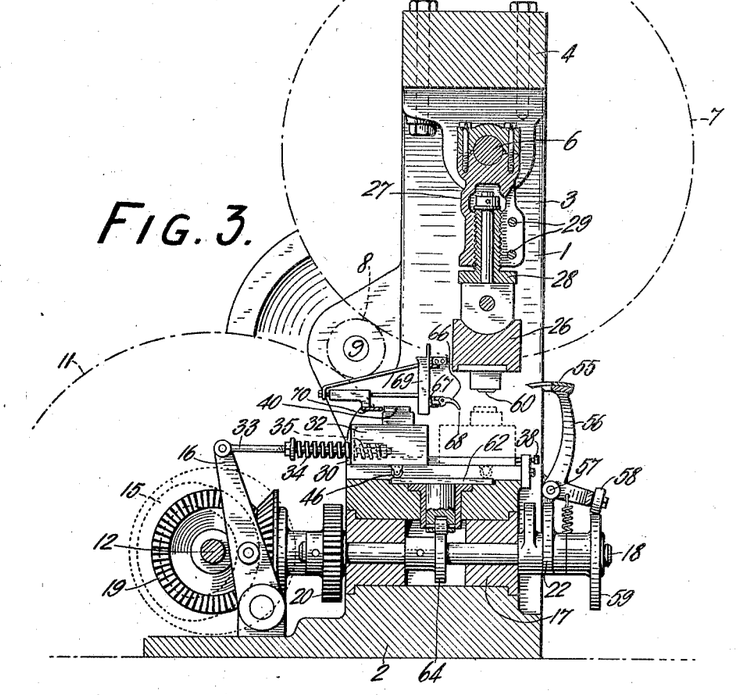
Fig. 3 is a sectional side elevation of the machine shown in Figs. 1 and 2.

For unclipped horseshoes this completes the cycle of operations, and the modified machine is both continuous and automatic in its action similarly to the machine illustrated in Figs. 1, 2 and 3 and hereinbefore described.

When it is desired to manufacture horseshoes furnished with a clip or projection formed from the metal of the horseshoe itself and in most cases located at the toe of the horseshoe, this clipping operation is performed automatically and at an approved stage in the cycle of operations of the machine illustrated in Figs. 1, 2 and 3 or of the modified machine shown in Figs. 19 and 20, by the employment of the attachments illustrated in Figs. 23 and 24, respectively, and which are secured to their respective machines by bolts or any other approved means.

The device illustrated in Fig. 23 is attached to the housing 3 of the machine 1 so that the roller 77 on the rear end of the lever 75 contacts with the former guide 78 secured to the longitudinal slide 32.

As the said slide 32 advances carrying the heated blank with it through the forging rollers 52, as hereinbefore described, the said roller 77 is constrained to pass along the said former guide 78.

The contour of the former guide 78 is such that at a predetermined point in the forward travel of said slide 32 the roller 77 on the rear end of the lever 75 is caused to rise sharply and is then released, and drawn back to its original position by the spring 79. This results in the sharp descent and ascent of the opposite end of said lever carrying the clipping tool 76 which displaces from the horseshoe an amount of metal sufficient to form a clip. On the descent of the vertical slide 26 the clip finishing tool 80$^a$ attached to the die 60 forces said displaced metal into the recess 80$^b$ formed in the periphery of the seating-die 43 thereby forming the clip.

The longitudinal slide 32 being controlled in its movements by a cam 15, it will be understood that this cam 15 can be so designed and timed as to cause the said slide to halt at any predetermined point in its stroke and there to remain while the clipping operation described is being performed.

Alternately the clipping mechanism described may be operated by a distinct cam mounted either on the crank-shaft 6 or on the cam-shafts 12 or 18.

The device illustrated in Fig. 24 is attached to the slide 32$^1$ of the machine 1$^1$ by bolts so that the roller 77$^1$ on the rear end of the lever 75$^1$ contacts with the former guide 78$^1$ secured to the machine base 2$^1$. As the said slide 32$^1$ advances and the heated blank is thereby carried in front of the forging rollers 52$^1$ and rolled around the stationary die-form 44$^1$, as hereinbefore described the roller 77 is constrained to pass along the said former guide 78$^1$. The design of the former guide 78$^1$ is such that at a predetermined point in the forward travel of the said slide 32$^1$ the said roller 77$^1$ is caused to rise sharply and is then released, and drawn back by the spring 79$^1$ to its original position. This results in the sharp descent and ascent of the clipping tool 76$^1$ in a manner similar and for the same purpose as hereinbefore described. On the completion of the inward stroke of the slide 32$^1$ the tool 80$^1$ secured to the forward end of said slide forces the displaced metal into a recess 80$^b$ formed in the periphery of the seating-die 43$^1$ thereby forming the desired clip.

Figure 22:
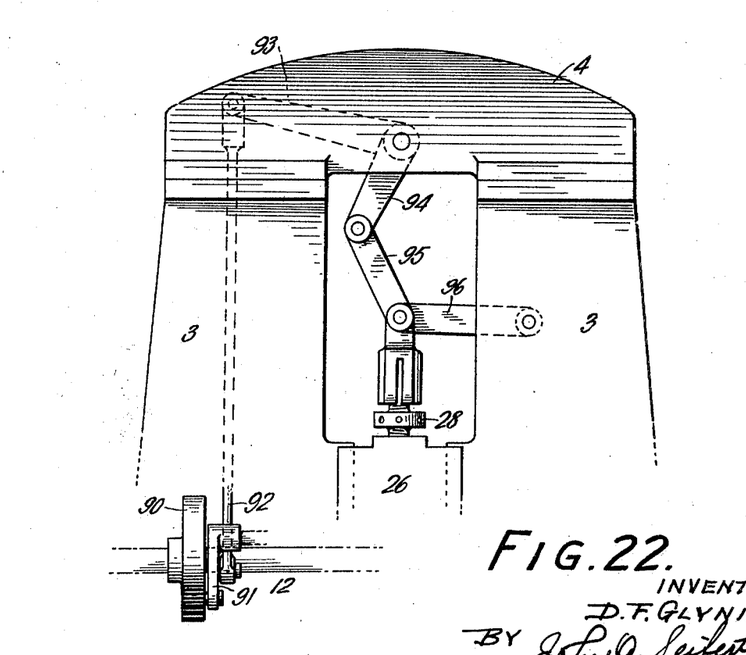
Fig. 22 is a diagrammatic view of a modification of part of the mechanism of the machine.

Fig. 22 illustrates an alternative means for the operation of the vertical slide 26 through the connecting rod 27 for forging machines constructed in accordance with the invention.

In this view 90 indicates a grooved cam which is fitted on the transverse cam-shaft 12 and engages with a roller (not shown) on the end of a rocking lever 91. A vertical link 92 connects the opposite end of said rocking lever 91 with a lever 93 which is pivoted in the top brace 4.

94 and 95 are the arms of a toggle which is operated by the grooved cam 90 through the levers and connecting link described. A tie-link 96 is pivoted in the machine housing 3.

It is to be understood that modifications of machine design such as described with reference to Fig. 22 and furnished by way of example may be made within the scope of the invention.

What I do claim is:—

1. In an automatic forging machine, a frame, guides in said frame, slides in said guides, dies or tools mounted on said slides, means for operating said slides from different directions and in different planes to a common point, means controlling the timing of the movement of said slides to conform to a definite sequence and relationship, a magazine feeding heated blanks to said dies, a cut-off gate in said magazine, means automatically operating said gate in unison with the movements of said slides, an extractor removing the forged work from said dies, and means automatically operating said extractor in unison with the movements of said slides, substantially as described.

2. In an automatic forging machine, a frame, guides in said frame, slides in said guides, dies or tools mounted on said slides, means for operating said slides from different directions and in different planes to a common point, former guides on one of said slides, arms movably mounted in said frame, forging and forming rollers revolubly mounted on said arms, said former rollers being arranged to be engaged by the former guides, substantially as described.

3. In an automatic forging machine, a frame, a horizontal and a vertical guide in said frame, slides operating in said guides, a die-form in said machine, arms movably mounted in said machine, forging rollers revolubly mounted on said arms, dies or tools attached to said vertical slide imparting depressions to a heated blank previously shaped around said die-form by said forging rollers, a magazine feeding heated blanks to said dies, a cut-off gate in said magazine, means automatically operating said gate in unison with the movements of said horizontal slide, an extractor removing the forged work, and means automatically operating said extractor in unison with said slides, substantially as described.

4. In an automatic forging machine, a frame, a horizontal and a vertical guide in said frame, slides operating in said guides, a die on one of said slides, a die-form within said die and projecting above it, a die attached to the other of said slides, means for advancing the first mentioned slides to a position whereby the die on the second slide is directly above work situated around and resting on the die surrounding said die-form, means operating said second slide and simultaneously imparting depressions on both upper and lower surfaces of the work between the dies, substantially as described.

5. In an automatic forging machine, a frame, a horizontal and a vertical guide in said frame, slides operating in said guides, a die on one of said slides, a die-form within said die and projecting above it, a die attached to the other of said slides, means for advancing the first mentioned slide to a position whereby the die on the second slide is directly above work situated around and resting on the die surrounding said die-form, means operating said second slide and simultaneously imparting depressions on both upper and lower surfaces of the work between the dies, a magazine feeding heated blanks to said dies, a cut-off gate in said magazine, means for automatically operating said gate in unison with the movement of said first mentioned slide, a stripper, means advancing said stripper over the work, means elevating said die-form, an extractor removing the forged work and means automatically operating said extractor in unison with said slides, substantially as described.

6. In an automatic forging machine, a frame, a horizontal guide and a vertical guide in said frame, slides operating in said guides, a die on the horizontal slide, a die-form within and projecting above said die, former guides mounted on said horizontal slide, former and forging rollers, carriers for said rollers to coöperate with the former guides to have movement imparted thereto to bend a heated blank around said die-form and forging the same to an outline corresponding to said former guides, a die attached to the other of said slides, means for operating the first mentioned slide carrying the work past the forging rollers and directly beneath the die on said second slide and for maintaining said advanced slide in said set position, and means for operating said second slide and simultaneously imparting depressions on both upper and lower surfaces of said work between the dies, substantially as described.

7. In an automatic forging machine, a frame, a horizontal guide and a vertical guide in said frame slides operating in said guides, a die on the horizontal slide, a die-form within and projecting above said die, former guides mounted on said slide, arms movably mounted in said frame, former and forging rollers on said arms to roll a heated blank around said die-form and forging the same to the outline corresponding to said former guides, a die attached to the other of said slides, means for operating the first mentioned slide carrying the work past the forging rollers and directly beneath the die on said second slide, and for maintaining said advanced slide in said set position, and means for operating said second slide simultaneously imparting depressions on both upper and lower surfaces of said work between the dies, a magazine from which to feed heated blanks to said dies, a cut-off gate in said magazine, means for automatically operating said gate in unison with the movement of said first mentioned slide, a stripper, means advancing said stripper over the work, means elevating said die-form, an extractor removing the forged work and means automatically operating said extractor in unison with said slides, substantially as described.

8. In an automatic forging machine for the manufacture of horseshoes, a frame having three slides operating in a horizontal plane and one slide operating in a vertical plane to a common point, an inner die-form corresponding to the inner outline of the article to be forged, arms movably mounted in the frame, forging rollers carried by said arms, former rollers on said arms, former guides in said machine controlling said former rollers and causing said forging rollers to roll a straight heated blank around said die-form and simultaneously forge a blank to shape, dies or tools on said horizontal slides correcting the outer outline of the bent and forged blank, dies or tools on the vertical slide, a die surrounding said inner die-form, and means operating said slides continuously and automatically, substantially as described.

9. In an automatic forging machine for the manufacture of horseshoes, a frame having three slides operating in a horizontal plane and one slide operating in a vertical plane to a common point, an inner die-form corresponding to the inner outline of a horseshoe, arms movably mounted in said machine, forging rollers secured to said arms, former rollers on said arms, former guides in said machine controlling said former rollers and causing said forging rollers to roll a straight heated blank around said die-form and simultaneously forge the outer periphery of said blank to horseshoe shape, dies or tools on said horizontal slides correcting the outer outline of the bent and forged blank, dies or tools on the vertical slide, a die surrounding said inner die-form, a magazine feeding heated blanks to said dies, a cut-off gate in said magazine, a stripper advancing over the finished horseshoe, means elevating said inner die-form, an extractor removing the forged horseshoe, means automatically operating said cut-off gate and said extractor in unison with the movements of said slides, and means for operating said slides continuously and automatically, substantially as described.

10. In an automatic forging machine, a frame, guides in said frame, a vertical slide and a horizontal slide operating in said guides, dies or tools mounted on said slides, former guides, forging rollers, movably supported carriers for said rollers, former rollers on said carriers to coöperate with the former guides, a clipping lever having a clipping tool at one end and a roller at the opposite end, an actuating guide for said clipping lever against which the roller of the clipping lever is yieldingly urged, and a clip finishing tool attached to the vertical slide, substantially as described.

11. In an automatic forging machine, a frame, guides in said frame, slides in said guides, dies or tools mounted on said slides, means operating said slides from different directions and in different planes to a common point, rigidly secured former guides, movably mounted arms, forging rollers revolubly attached to said arms, former rollers on said arms contacting with said former guides, a pivoted clipping lever, a clipping tool on said lever, means for actuating said lever about its pivot, and a clip finishing tool on one of said slides, substantially as described.

12. In an automatic forging machine, a frame, guides in said frame, a vertical slide and a horizontal slide operating in said guides, dies or tools mounted on said slides, former guides on one of said slides, arms movably mounted in said frame, forging rollers revolubly attached to said arms, former rollers on said arms contacting with said former guides, a clipping lever pivoted in said frame, an actuating guide for said clipping lever and secured to one of said slides, a clipping tool at one end and a roller at the opposite end of said clipping lever, said roller contacting with said actuating guide and a clip finishing tool on the other of said slides, substantially as described.

13. In an automatic forging machine, a frame, a base, housings on said base, a longitudinal and two transverse guides formed horizontally in said base, a vertical guide formed in said housings, slides operating in said guides, a driving shaft in said base, a crank-shaft in said housings, a transverse and a longitudinal cam-shaft mounted in said base, cams on said cam-shafts, rocking levers pivoted in said base and operated by said cams, connections between said rocking levers and said slides, a pitman rod operated by said crank-shaft and connected to said vertical slide, a die with a movable member mounted on said longitudinal slide, former guides mounted one on each side of said die, slidable arms mounted on said base, former rollers and forging rollers secured to said slidable arms, dies attached to said slides, a cam raising said die movable member, a cam operated stripping lever pivotally mounted in said base, and gearing transmitting rotary motion to and from the driving shaft to the crank-shaft and to the cam shafts, substantially as described.

14. An automatic forging machine comprising a frame having a base, vertical housings on said base, a longitudinal and two transverse guides formed horizontally in said base, a vertical guide formed in said housings, slides operating in said guides, a driving shaft mounted in said base, a crank-shaft rotating in said housings, a transverse cam-shaft mounted in said base, a longitudinal cam-shaft fitted in said base, a cam on said transverse cam-shaft, a rocking lever pivoted in said machine base and operated by said cam, a link connecting said rocking lever to the slide in said longitudinal guide, a buffer connection between said link and said slide, cams on the longitudinal cam-shaft, rocking levers pivoted in said machine base and operated by said cams and connected at their opposite ends to the slides in said transverse guides, a connecting rod operated by said crank-shaft and connected to said vertical slide, a die with a movable member mounted on said longitudinal slide, former guides mounted one on each side of said die, arms slidably mounted on said machine base, former rollers attached to said arms and contacting with said former guides, forging rollers attached to said arms, dies attached to the said transverse slides, a die attached to the vertical slide, a cam plate beneath the longitudinal slide, a cam on said longitudinal cam-shaft operating said cam plate, a vertical rod extending upwardly through the longitudinal slide, and attached at its upper end to the movable member of the die mounted on said longitudinal slide, a spring on said vertical rod, a roller on said rod contacting with said cam plate, a stripping lever pivotally mounted on the machine base, a stripper plate on said stripping lever, a cam on the longitudinal cam-shaft operating said stripping lever, a feed magazine secured to said base above said longitudinal slide, a cut-off gate in said magazine operated by the movement of said longitudinal slide, extractor catches pivotally mounted on said magazine, an inclined delivery chute attached to said longitudinal slide, an inclined chute fitted to said base, and gearing transmitting rotary motion from the main driving shaft to the crank-shaft, to the transverse and longitudinal cam-shafts, substantially as described.

In testimony whereof I affix my signature in presence of two witnesses.

D. F. GLYNN.

Witnesses:
 MARGARET ROSSITER,
 JAMES H. ANDERSON.